United States Patent
Rech et al.

(10) Patent No.: US 12,481,674 B2
(45) Date of Patent: Nov. 25, 2025

(54) QUERY OFFLOADING IN A COMPUTER SYSTEM

(71) Applicant: INTERNATIONAL BUSINESS MACHINES CORPORATION, Armonk, NY (US)

(72) Inventors: Thomas Rech, Rittersheim (DE); Hans-Jürgen Zeltwanger, Weinsberg (DE); Dirk Nakott, Stuttgart (DE); Jens Peter Seifert, Gaertringen (DE); Martin Jungfer, Ostelsheim (DE); Holger Hellmuth, Bensheim (DE); Jörn Klauke, Petersberg (DE); Alexander Zietlow, Sandhausen (DE)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 17/653,315

(22) Filed: Mar. 3, 2022

(65) Prior Publication Data

US 2023/0281218 A1    Sep. 7, 2023

(51) Int. Cl.
*G06F 16/27* (2019.01)
*G06F 16/2458* (2019.01)

(52) U.S. Cl.
CPC .......... *G06F 16/27* (2019.01); *G06F 16/2471* (2019.01)

(58) Field of Classification Search
None
See application file for complete search history.

(56) References Cited

U.S. PATENT DOCUMENTS 7,734,580 B2    6/2010  Lahiri
10,268,704 B1 *  4/2019  Sanderson ............ G06F 16/278
(Continued)

FOREIGN PATENT DOCUMENTS

CN        110196859 A    9/2019
WO    2023/166373 A1    9/2023

OTHER PUBLICATIONS

Huaming Wu; Multi-Objective Decision-Making for Mobile Cloud Offloading: A Survey; 2017; IEEE; pp. 1-15 (Year: 2017).*
(Continued)

*Primary Examiner* — Albert M Phillips, III
*Assistant Examiner* — Jermaine A Mincey
(74) *Attorney, Agent, or Firm* — Edward J. Wixted, III

(57) ABSTRACT

An approach includes collecting metadata indicative of a computer system comprising (i) a primary database, configured to connect to a secondary database, and (ii) the secondary database that replicates the primary database. The approach further includes receiving, at the primary database from a requestor, a query referencing the primary database. The approach further includes, responsive to receiving the query, performing an offload including: determining a first load on the primary database; responsive to the first load satisfying a first offload condition, determining, using the metadata, whether a second load on the secondary database satisfies a second offload condition; and responsive to the second load satisfying the second offload condition, offloading at least part of the query to the secondary database in order to cause the at least part of the query to be executed by the secondary database. The method further includes providing to the requestor results of the query.

16 Claims, 5 Drawing Sheets

(56) References Cited

U.S. PATENT DOCUMENTS

| | | |
|---|---|---|
| 10,698,882 B2 | 6/2020 | Parikh |
| 2018/0150368 A1 | 5/2018 | Lee |
| 2018/0157710 A1* | 6/2018 | Guirguis ................. G06F 16/27 |
| 2018/0278685 A1 | 9/2018 | Tiwari |
| 2019/0079841 A1 | 3/2019 | Lee |
| 2019/0392067 A1 | 12/2019 | Sonawane |
| 2020/0034055 A1 | 1/2020 | Aron |
| 2020/0097593 A1 | 3/2020 | Chen |
| 2021/0303572 A1 | 9/2021 | Ouyang |
| 2022/0179859 A1* | 6/2022 | Faltin ................. G06F 16/24556 |
| 2022/0300380 A1* | 9/2022 | Beier .................... G06F 16/214 |

OTHER PUBLICATIONS

International Searching Authority, "Written Opinion of the International Searching Authority", International application No. PCT/IB2023/051398, International Filing Date Feb. 16, 2023, Mailed on Jun. 19, 2023, 8 pages.

"Database Load Balancing for MySQL and MariaDB with ProxySQL", Several Nines, Printed Mar. 3, 2022, 20 pages, <https://severalnines.com/resources/tutorials/proxysql-tutorial-mysql-mariadb>.

* cited by examiner

QUERY OFFLOADING IN A COMPUTER SYSTEM

BACKGROUND

The present invention relates to database systems, and more specifically, to an approach for operating a database system comprising a primary database and a secondary database.

Database availability is a priority in database systems. Different solutions may exist in database systems for ensuring the database availability. For example, high availability disaster recovery (HADR) systems provide a high availability solution for both partial and complete site failures. HADR systems protect against data loss by replicating data changes from a primary database to a secondary database.

Several approaches exist for managing failures and optimizing the recovery at the HADR systems. However, there is a need to further improve the usage of the HADR systems.

SUMMARY

Various embodiments provide a method for a computer system, primary database system and computer program product as described by the subject matter of the independent claims. Advantageous embodiments are described in the dependent claims. Embodiments of the present invention can be freely combined with each other if they are not mutually exclusive.

In one aspect, the invention relates to a computer-implemented method that includes collecting metadata indicative of a computer system comprising (i) a primary database, configured to connect to a secondary database, and (ii) the secondary database that replicates the primary database. The method further includes receiving, at the primary database from a requestor, a query referencing the primary database. The method further includes, responsive to receiving the query, performing an offload including: determining a first load on the primary database; responsive to the first load satisfying a first offload condition, determining, using the metadata, whether a second load on the secondary database satisfies a second offload condition; and responsive to the second load satisfying the second offload condition, offloading at least part of the query to the secondary database in order to cause the at least part of the query to be executed by the secondary database. The method further includes providing to the requestor results of the query.

In another aspect, the invention relates to a computer program product that includes one or more computer readable storage media, and program instructions collectively stored on the one or more computer readable storage media. The computer program product further includes program instructions to collect metadata indicative of a computer system comprising (i) a primary database, configured to connect to a secondary database, and (ii) the secondary database that replicates the primary database. The computer program product further includes program instructions to receive, at the primary database from a requestor, a query referencing the primary database. The computer program product further includes program instructions to, responsive to receiving the query, perform an offload comprising: determining a first load on the primary database; responsive to the first load satisfying a first offload condition, determining, using the metadata, whether a second load on the secondary database satisfies a second offload condition; and responsive to the second load satisfying the second offload condition, offloading at least part of the query to the secondary database in order to cause the at least part of the query to be executed by the secondary database. The computer program product further includes program instructions to provide to the requestor results of the query.

In another aspect, the invention relates to a computer system that includes one or more computer processors, one or more computer readable storage media, and program instructions collectively stored on the one or more computer readable storage media for execution by at least one of the one or more computer processors. The computer system further includes program instructions to collect metadata indicative of a computer system comprising (i) a primary database, configured to connect to a secondary database, and (ii) the secondary database that replicates the primary database. The computer system further includes program instructions to receive, at the primary database from a requestor, a query referencing the primary database. The computer system further includes program instructions to, responsive to receiving the query, perform an offload comprising: determining a first load on the primary database; responsive to the first load satisfying a first offload condition, determining, using the metadata, whether a second load on the secondary database satisfies a second offload condition; and responsive to the second load satisfying the second offload condition, offloading at least part of the query to the secondary database in order to cause the at least part of the query to be executed by the secondary database. The computer system further includes program instructions to provide to the requestor results of the query.

The above described embodiments may be advantageous because the embodiments may dynamically check the resources of the primary database system. For example, at the time of receiving the query, the primary database system may have enough resources to run the query; however, during execution of the query the resources may not be enough anymore. Such embodiments may thus further improve the dynamic reroute of the queries by constantly checking the loads.

BRIEF DESCRIPTION OF THE DRAWINGS

In the following embodiments of the invention are explained in greater detail, by way of example only, making reference to the drawings in which.

DETAILED DESCRIPTION

Figure 1:
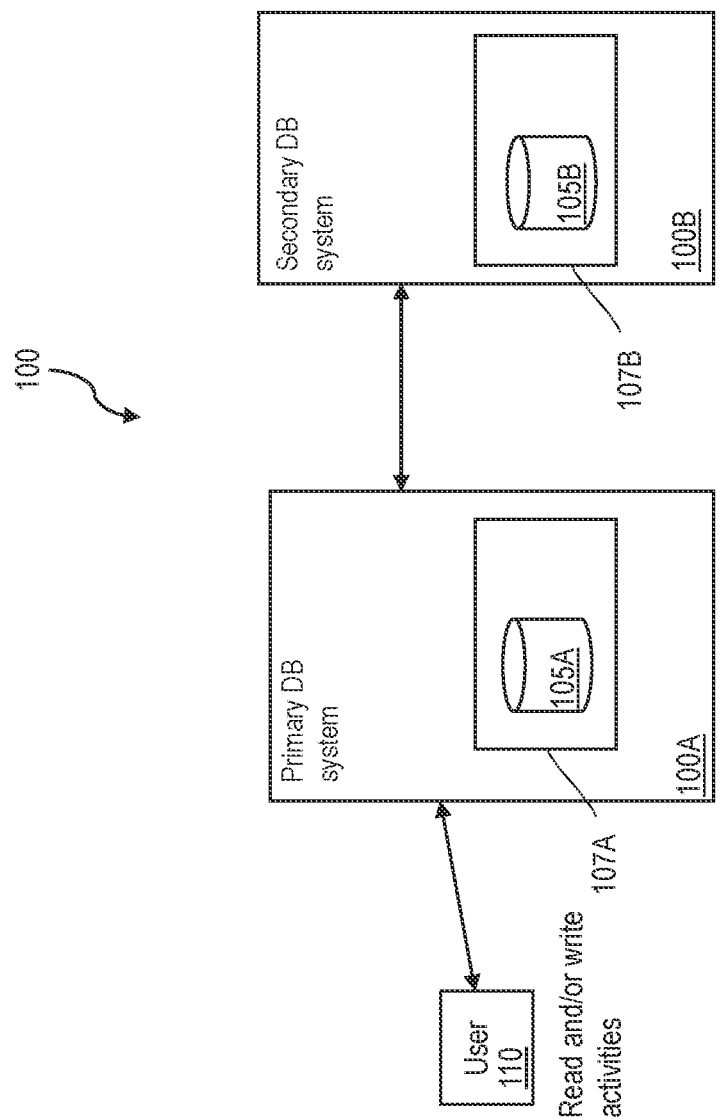
FIG. 1 depicts a computer system, in accordance with an embodiment of the present invention.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the secondary database system may also be referred to as a standby system or a disaster recovery (DR) system. Further, as also used herein, the primary database system may be referred to as a high availability (HA) system. The computer system comprising the primary and secondary database systems may be referred to as a high availability disaster recovery (HADR) system.

The primary database system and the secondary database system may initially comprise a same dataset. After, the dataset may change at the primary database system. The primary database system may enable to replicate the change to the secondary database system so that the secondary database system may apply the same change and thus get the same content as in the primary database system. The secondary database replicating the primary database may mean that a replication of changes to tables of the primary database are performed in order to apply said changes to the corresponding tables of the secondary database so that at least part of the tables of the secondary database are synchronized with the corresponding tables of the primary database. For example, the secondary database replicates the primary database so that the whole secondary database is synchronized with the whole primary database or one or more tables of the secondary database are synchronized with the corresponding tables of the primary database.

The primary database system may be active. A database system being active may mean that the database system may receive queries, execute the queries, and provide results of the queries. The secondary database system may be inactive while the primary database system is active. Hardware and software may be installed and ready to be used in the secondary database system, but may not be running or performing active work while the primary database system is in operation. Following a failure of the primary database system, the secondary database system may activate to enable the recovery or continuation of the processing of data. Accordingly, the data stored in the primary database system may be synchronized with data of the secondary database system.

Embodiments of the present invention may enable use of the secondary database system, not only for disaster recovery purposes, but also to offload some loads from the primary database system. Using the secondary database system for such a purpose may enable execution of non-intrusive workloads and thus optimize resource usage. For example, the secondary database system may be used for serving read-only workloads like backups and reporting queries of the requestor. The requestor may, for example, be a database client application.

The decision to offload the queries may dynamically be determined for received queries. That is, the offloading is not unconditionally executed for every type of query; rather, only queries that fulfil conditions may be offloaded. The requestor may connect only to the primary database system and may receive results of the query from the primary database system. This may provide a transparent reroute mechanism of workloads to the secondary database, in that the requestor may not see how the query is executed and would receive the results of the query as the query is executed at the primary database system. For example, a database client application may not see any change in behavior as the workload is transparently routed to the secondary database system while the application only connects to the primary database system. This may prevent requirements to maintain the user access permissions on the secondary database system. Also, this may prevent access from the requestor to both the primary and secondary database systems, said access may be disadvantageous because secure environments with firewall access are more complicated to setup for such access.

The present subject matter may, for example, provide a proxy concept that transparently routes Structured Query Language (SQL) access to a standby database based on a decision by an SQL query optimizer or decisions by a workload management component. Unlike existing solutions, embodiments of the present invention may require only a connection from the application to the primary database system and no change in SQL statements or hints added to the SQL statement may be needed. Embodiments of the present invention may dynamically route SQL workloads to standby systems.

According to one embodiment, an offload method is performed before or during execution of the received query. The offload method may, for example, be performed before execution of the received query. In another example, upon receiving the query, the query may be executed and while being executed the offload method may be performed. In case the offload method is performed during execution of the query, the feature of executing the query at the primary database system means continuing execution of the query (executing remaining nonexecuted part of the query). Such an embodiment may enable a dynamic reroute of the queries. In one example, the offloaded at least part of the query may be the whole query in case the offload method is performed before the query starts. In another example, the offloaded at least part of the query may be a nonexecuted part of the query in case the offload method is performed during execution of the query. In another example, the offloaded at least part of the query may be the whole query in case the offload method is performed during execution of the query. In this case, the results of the already executed part of the query at the primary database system may be discarded or undone. In yet another example, the query may be divided into two parts, first part (part1) and second part (part2) so that the at least offloaded part of the query is part2. The division of the query may, for example, be performed a priori e.g., before performing the offload method. In case the offload method is performed, before executing the query, part1 may be executed at the primary database system and part2 may be the offloaded at least part of the query; however, if the offload method is performed during the execution of the query, and the already executed part of the query is part0 at the time the first and second offload conditions are fulfilled, part1 and part2 may dynamically be adapted if part1 is different from the already executed part0 so that part1 may include part0 and part2 may be the remaining part of the query; otherwise the initial part1 and part2 may be used.

According to one embodiment, the offload method is repeatedly performed upon receiving the query and until the offloading is performed or until execution of the query is completed. Accordingly, the offload method may be performed before or during execution of the query. Such an embodiment may be advantageous because the embodiment may dynamically check the resources of the primary database system. For example, at the time of receiving the query, the primary database system may have enough resources to run the query; however, during execution of the query the resources may not be enough anymore. This embodiment may thus further improve the dynamic reroute of the queries by constantly checking the loads.

For example, the first load may comprise values of N1 parameters $P_1 \ldots P_{N1}$, where $N1 \geq 1$. Each of the N1 parameters $P_1 \ldots P_{N1}$ may be associated with one or more first thresholds. The first load condition may, for example, require that each parameter of all N1 parameters $P_1 \ldots P_{N1}$ does exceed the respective first threshold(s). In another example, the first load condition may require that each parameter of a subset of the N1 parameters $P_1 \ldots P_{N1}$ does exceed the respective threshold. According to one embodiment, the parameter of the N1 parameters $P_1 \ldots P_{N1}$ comprises any one of: bandwidth utilization, central processing unit (CPU) utilization, execution queue length, number of records of the query, and runtime, wherein the first offload condition requires that at least one of the values of the N1 parameters exceeds a respective first threshold. The runtime may be the time needed to execute the query.

For example, the second load may comprise values of N2 parameters $I_1 \ldots I_{N2}$, where $N2 \geq 1$. Each of the N2 parameters $I_1 \ldots I_{N2}$ may be associated with one or more second thresholds. The second load condition may, for example, require that each parameter of all N2 parameters $I_1 \ldots I_{N2}$ does exceed the respective threshold(s). In another example, the second load condition may require that each parameter of a subset of the N2 parameters $I_1 \ldots I_{N2}$ does exceed the respective second threshold(s). According to one embodiment, the parameter of the N2 parameters $I_1 \ldots I_{N2}$ comprises any one of: bandwidth utilization, CPU utilization, execution queue length, number of records of the query, and runtime, wherein the second offload condition requires that at least one of the values exceeds a respective second threshold.

In one example, the set of N2 parameters $I_1 \ldots I_{N2}$ may be the set of the N1 parameters $P_1 \ldots P_{N1}$. This may enable a consistent check of the load at the primary and secondary database systems. In one example, the set of N2 parameters $I_1 \ldots I_{N2}$ may be a subset of the N1 parameters $P_1 \ldots P_{N1}$. Such an approach may perform further checks at the primary database system that may not be needed at the secondary database system e.g., checking the number of records involved in the query may advantageously be performed only once at the primary database system. This may save resources that would otherwise be required by unnecessary (repeated) checks at the two systems. In one example, the set of N2 parameters $I_1 \ldots I_{N2}$ may be different from the N1 parameters $P_1 \ldots P_{N1}$ e.g., the two sets of parameters may be partially overlapping or not overlapping. This may enable to adapt the offload conditions to the specificities of each of the systems.

According to one embodiment, the first offload condition is the second offload condition. According to another embodiment, the first offload condition is different than the second offload condition.

According to one embodiment, the first offload condition further requires that the received query is a read-only query. The first offload condition may require that the query comprises only read statement(s).

In order to dispatch or offload the query to the secondary database system, additional information about the status of the secondary database system may be maintained at the primary database system. The additional information may be provided as metadata. According to one embodiment, the metadata comprises connection information of the connection to the secondary database system, status information of the secondary database system, and workload information at the secondary database system. The status information comprises, at least one of, availability and execution queue length. The workload information may indicate a last applied transaction at the secondary database system.

For example, the metadata may be stored in a metadata storage compartment of the primary database system. The metadata storage compartment may not be persistent on disk but held in memory on the primary database system. It however may partly read persistent metadata from the primary database system e.g., to obtain the connection information to the secondary database system.

According to one embodiment, the metadata is updated upon start-up of the primary database system and/or start-up of the secondary database system and/or upon changing data in the secondary database. This may provide an up-to-date metadata which may ensure accurate results of the offload method.

According to one embodiment, the connection information is updated upon start-up of the primary database system, the status information is updated upon start-up of the secondary database system, and the workload information is updated upon changing data in the secondary database.

According to one embodiment, the approach comprises storing the metadata in a non-persistent storage, which may increase speed. In particular, the offload method may be performed in a fast manner.

According to one embodiment, the approach further comprises determining, using the metadata, whether a copy of data of the primary database that is referenced by the query is present in the secondary database, wherein the offloading is performed if the copy of the data is present in the secondary database. For example, the data referenced by the query may be the whole primary database or one or more tables of the primary database.

According to one embodiment, the approach is automatically performed at the primary database system.

FIG. 1 is a diagram of a computer system 100 according to an example of the present subject matter. The computer system 100 comprises a primary database system 100A and a secondary database system 100B.

The primary database system 100A comprises a storage 107A for storing a database 105A referred to as primary database. The storage 107A may comprise metadata compartment (not shown) for storing metadata. The metadata may comprise connection information of the connection to the secondary database system 100B, and status information of the secondary database system 100B. The status information may comprise at least one of availability, last applied transaction and execution queue length. Users, such as user 110 may utilize a user device, such as a computer, to send queries to the primary database system 100A. For example, the user 110 may be communicably coupled to the primary database system 100A through the Internet or through a local area network (LAN).

The secondary database system 100B may be connected to the primary database system 100A through a network, the network may include one or more of a local area network, wide area network, system area network, the Internet, and other network types. Using the network connection, the primary and secondary database systems may be situated in different remote locations. For example, the primary database system 100A may be located in one city and the secondary database system 100B may be located in another city.

The secondary database system 100B comprises a storage 107B for storing a database 105B referred to as secondary database. The secondary database 105B may comprise tables of the primary database 105A. The computer system 100 may be configured so that the primary database 105A and secondary database 105B are synchronized.

In the disaster case, the secondary database system 100B may be activated. For example, if a disaster occurs at the primary database system 100A, data availability is maintained by having the secondary database system 100B take over as the primary database system 100A.

The present subject matter may further make use of the secondary database system 100B by offloading query execution from the primary database system 100A to the secondary database system 100B, without having to connect the client or the user 110 (who sent the query) to the secondary database system 100B, which may enable use of the secondary database system 100B, not only for disaster recovery purposes, but also for offloading execution of queries.

Figure 2:
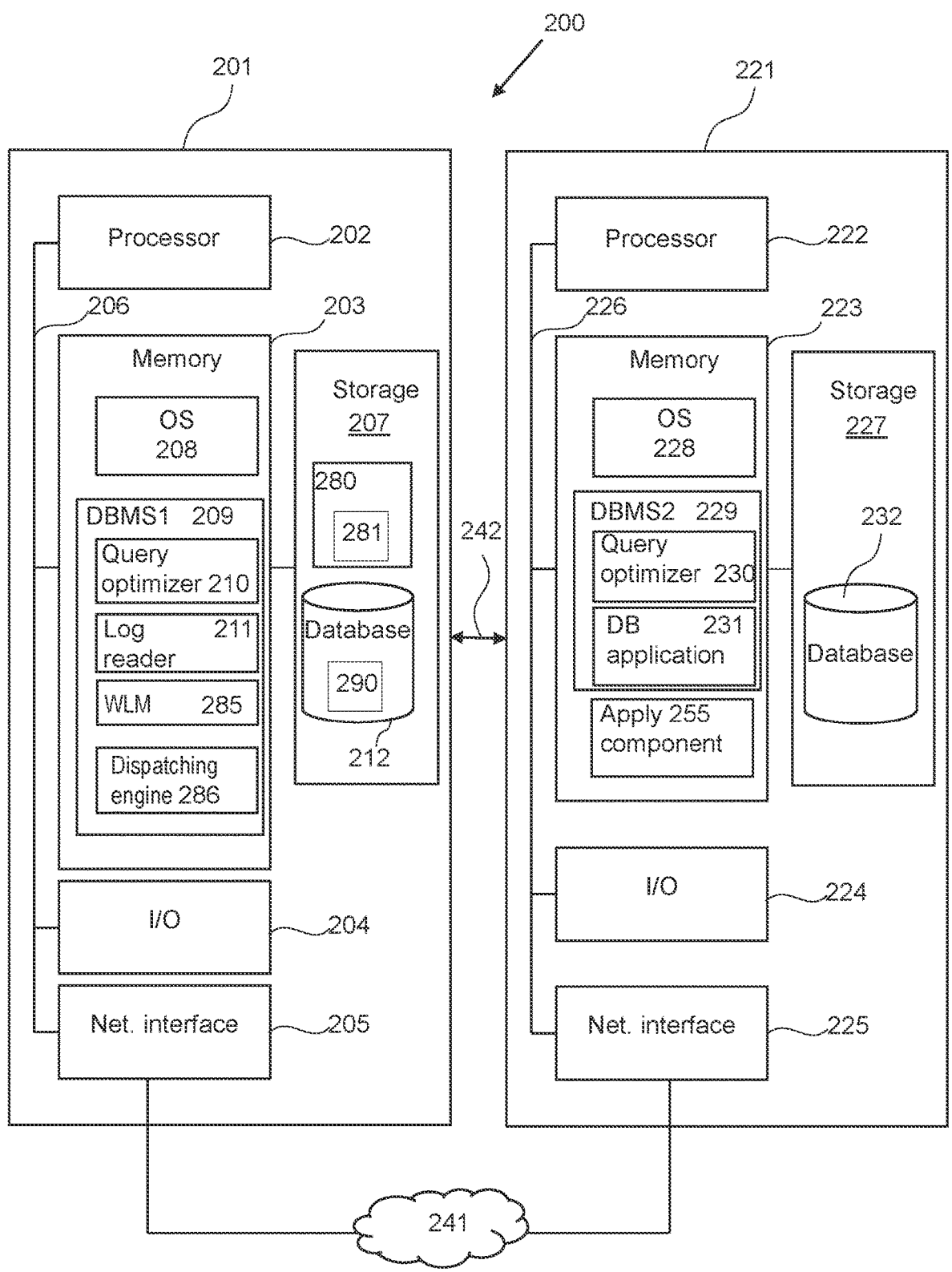
FIG. 2 depicts a database system, in accordance with an embodiment of the present invention.

FIG. 2 is a block diagram for a computer system 200 in accordance with an example of the present subject matter. The computer system 200 may provide further details of the computer system 100 of FIG. 1.

The computer system 200 may, for example, comprise a primary database system 201 connected to a secondary database system 221. The primary database system 201 may provide further details of the primary database system 100A of FIG. 1. The secondary database system 221 may provide further details of the secondary database system 100B of FIG. 1.

Primary database system 201 includes processor 202, memory 203, I/O circuitry 204 and network interface 205 coupled together by bus 206.

Processor 202 may represent one or more processors (e.g., microprocessors). The memory 203 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 203 can have a distributed architecture, where various components are situated remote from one another, but can be accessed by the processor 202.

Memory 203 in combination with persistent storage device 207 may be used for local data and instruction storage. Storage device 207 includes one or more persistent storage devices and media controlled by I/O circuitry 204. Storage device 207 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, Blu-ray, floppy disks, and the like. The storage 207 may comprise a primary database 212. The primary database 212 may, for example, comprise a primary table 290. The primary table 290 may comprise a set of attributes (columns) named $att_1, \ldots, att_n$. The storage 207 may further comprise a metadata compartment 280 for storing metadata 281 indicative of the computer system 200. The metadata 281 comprises connection information of the connection to the secondary database system 100B, and status information of the secondary database system 100B. The status information may comprise at least one of availability, last applied transaction and execution queue length. The connection information may comprise host and service port to be used for communication of the computer system 200 with the secondary database system, such information may be obtained from existing configuration data of the secondary database system. The computer system 200 may be configured to regularly update the metadata 281.

Memory 203 may include one or more separate programs e.g., database management system DBMS1 209, each of which comprises an ordered listing of executable instructions for implementing logical functions, notably functions involved in embodiments of the present invention. The software in memory 203 shall also typically includes a suitable operating system (OS) 208. The OS 208 essentially controls the execution of other computer programs for implementing at least part of methods as described herein. DBMS1 209 comprises a log reader 211 and a query optimizer 210. The log reader 211 may read log records of a transaction recovery log (not shown) of the primary database system 201 and provide changed records to the secondary database system 221. The log reader 211 may read log records from the recovery log, extract relevant modification or change information (inserts/updates/deletes targeting tables in replication). Extracted information may be transmitted (e.g., as a request for application of the change) to secondary database system 221. The query optimizer 210 may be configured for generating or defining query plans for executing queries, e.g., on primary database 212. DBMS1 209 may use a workload management (WLM) component 285 and a dispatching engine 286 to classify workloads, monitor the activities or enforce actions. The WLM component 285 may, for example, consist of service classes and rules or thresholds associated with the classes. The rules may be based on thresholds of parameters such as duration, CPU usage, data read, rows read, etc. Each of the service classes may be associated with actions that can be executed when the service class is considered. A workload at the primary database system 201 may be assigned to one or more service classes by the WLM component 285 and the rules associated with the assigned class(es) may be used by the dispatching engine 286 to process the workload using the actions of the assigned classes. The workload may comprise one or more queries. The WLM component 285 may be configured according to the present subject matter to introduce an action to redirect the query to the secondary database system 221. In one example, this action is named "READ ON STANDBY". This action may be assigned to one or more service classes. For example, if a query's runtime exceeds a certain runtime, the query may be forced off the database to limit the impact. Hence, by (re)configuring the WLM component 285, the workload can be dynamically, and without any change on the client configuration or the application, routed by the dispatching engine 286 to the secondary database system 221. The following SQL statements provide an example of how a query can be routed by the dispatching engine 286 to the secondary database system using an example service class "READONLY ACTIVITIES" that is assigned to the query. This service class has the example action "READ ON STANDBY" and is associated with a rule indicating that the query is to be offloaded to the secondary database system if the number of queued activities is higher than two and the number of concurrent activities is higher than nine:

```
CREATE THRESHOLD GOTOSTANDBY
    FOR SERVICE CLASS READONLY ACTIVITIES
    ENFORCEMENT DATABASE
    WHEN CONCURRENTDBCOORDACTIVITIES > 9 AND
    QUEUEDACTIVITIES > 2
    CONTINUE READ ON STANDBY.
```

The present approach may, for example, enable the dispatching engine 286 to dispatch a SQL query workload to the secondary database system 221 when the following conditions are met: the primary database system 201 starts queuing workload based on resource shortage and the execution rules defined in the WLM component 285, the secondary database is in sync with the primary database 212, identified by information in the metadata storage compartment 280, and the SQL execution queue is not exhausted on the secondary database. The dispatching engine 286 may route the SQL query to the secondary database system 221 if above conditions are met, retrieves the results and ships the result set to the client. This may generate only little resource consumption on the primary database system 201—mainly CPU and memory requirements—compared to a full query execution.

Secondary database system 221 includes processor 222, memory 223, I/O circuitry 224 and network interface 225 coupled together by bus 226.

Processor 222 may represent one or more processors (e.g., microprocessors). The memory 223 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 223 can have a distributed architecture, where various components are situated remote from one another, but can be accessed by the processor 222.

Memory 223 in combination with persistent storage device 227 may be used for local data and instruction storage. Storage device 227 includes one or more persistent storage devices and media controlled by I/O circuitry 224. Storage device 227 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, Blu-ray, floppy disks, and the like.

Memory 223 may include one or more separate programs, e.g., database management system DBMS2 229 and apply component 255, each of which comprises an ordered listing of executable instructions for implementing logical functions, notably functions involved in embodiments of this invention. The software in memory 223 shall also typically include a suitable OS 228. The OS 228 essentially controls the execution of other computer programs for implementing at least part of approach described herein. DBMS2 229 comprises a DB application 231 and a query optimizer 230. The DB application 231 may be configured for processing data stored in storage device 227. The query optimizer 230 may be configured for generating or defining query plans for executing queries e.g., on a secondary database 232. The apply component 255 may buffer log records sent from the log reader 211 and consolidate the changes into batches to improve efficiency when applying the modifications to the secondary database 232 via a bulk-load interface. This may enable to perform replication. The replication may be advantageous if it is able to keep up with the amount of modifications in order to keep the latency stable. If modifications surpass replication speed, latency may build up and might be too high. For that, the primary database system 201 may be configured to perform a bulk load. The bulk load may load either entire table data or a set of partitions of a table at a given point in time. And data on the secondary database system 221 will reflect the primary database system state at the time the load was executed.

Primary database system 201 and secondary database system 221 may be independent computer hardware platforms communicating through a high-speed connection 242 or a network 241 via network interfaces 205, 225. The network 241 may, for example, comprise a local area network (LAN), a general wide area network (WAN), and/or a public network (e.g., the Internet). Each of the primary and secondary database systems 201 and 221 may be responsible for managing its own copies of the data.

Although shown in FIG. 2 as separate systems, the primary and secondary database systems may belong to a single system, e.g., sharing a same memory and processor hardware, while each of the primary and secondary database systems is associated with a respective DBMS and datasets, e.g., the two DBMSs may be stored in the shared memory. In another example, the two database management systems DBMS1 and DBMS2 may form part of a single DBMS that enables communications and method performed by DBMS1 and DBMS2 as described herein. The first and second datasets may be stored on a same storage or on separate storages.

Figure 3:
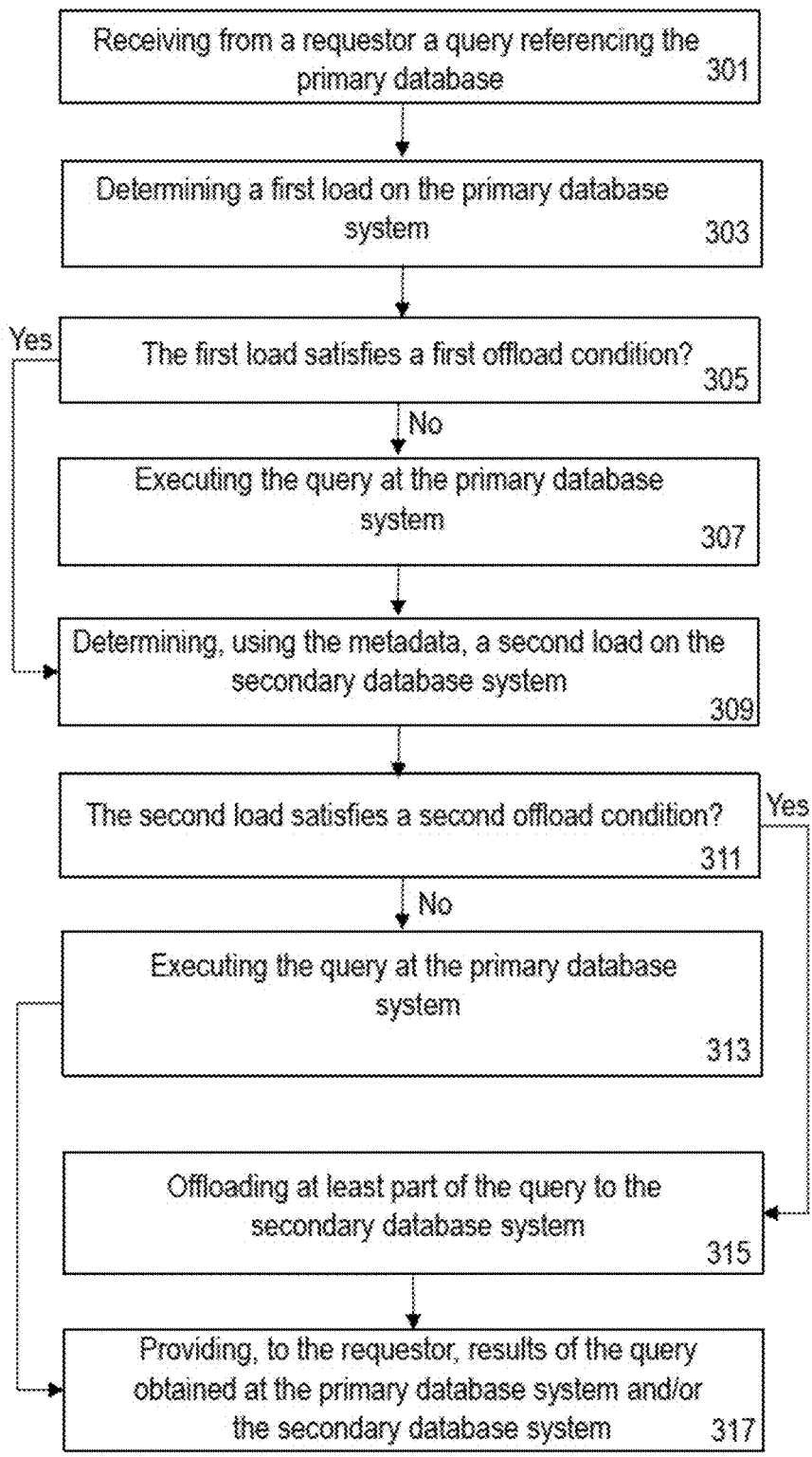
FIG. 3 is a flowchart of an approach for operating a computer system, in accordance with an embodiment of the present invention.

FIG. 3 is a flowchart of an approach for operating a computer system such as the computer system 100 in accordance with an embodiment of the present invention. For the purpose of explanation, the approach described in FIG. 3 may be implemented in the system illustrated in FIG. 1, but is not limited to this implementation. The method of FIG. 3 may, for example, be performed by the primary database system 100A.

The primary database system 100A may receive, in step 301, from a requestor such as user 110, a query referencing the primary database 212. The query comprises one or more query statements. The query statement may, for example, comprise one or more read statements. The requestor may, for example, be a user. The term "user" may refer to an entity, e.g., an individual, a computer, or an application executing on a computer that issues database queries. The requestor may, for example, be a database client application.

In order to decide whether to offload the query to the secondary database system 100B, the primary database system 100A may perform an offload method, wherein the offload method comprises steps 303 to 315. The offload method may automatically be performed upon receiving the query. The offload method may be executed before the query starts and/or during execution of the query at the primary database system 100A.

In response to receiving the query, the primary database system 100A may determine, in step 303, a first load on the primary database system 100A. The first load may, for example, comprise values of a first set of one or more performance parameters respectively. The performance parameter may comprise any one of: bandwidth utilization by the primary database system, CPU utilization at the primary database system, execution queue length at the primary database system, number of records involved in the query, and runtime at the primary database system.

The primary database system 100A may determine, in step 305, whether the first load satisfies a first offload condition. For example, the first set of performance parameters may be associated with thresholds, respectively. The first offload condition may, for example, require that values of the first set of performance parameters may exceed the respective thresholds.

In case the first load does not satisfy the first offload condition, the primary database system 100A may execute the query, in step 307. For example, if the primary database system 100A has enough resources to process the query, the first offload condition may not be satisfied and thus the query may be executed at the primary database system 100A.

In case the first load satisfies the first offload condition, the primary database system 100A may determine, in step 309, using the metadata 281, a second load on the secondary database system 100B. That is, the primary database system 100A may check the load on both sides 100A and 100B of the computer system 100 before offloading the query. This may ensure that the offloading provides improvement in resource usage compared to executing the query locally at the primary database system 100A.

The primary database system 100A may determine, in step 311, whether the second load satisfies the second offload condition. The second load may, for example, comprise values of a second set of one or more performance parameters, respectively. The performance parameter may comprise any one of: bandwidth utilization by the secondary database system, CPU utilization at the secondary database system, execution queue length at the secondary database system, number of records involved in the query, and runtime at the secondary database system. The second set of performance parameters may or may not be the same as the first set of parameters.

In case the second load does not satisfy the second offload condition, the primary database system 100A may execute the query in step 313.

In case the second load satisfies the second offload condition, the primary database system 100A may offload at least part of the query, in step 315, to the secondary database system 100B in order to execute the at least part of the query over the secondary database. In one example, the at least part of the query may be the whole query if the offload method is performed before the query execution starts. In one example, if the offload method is performed during execution of the query, the at least part of the query may be the whole query. In this case, the already executed part on the primary database system may be discarded. In one example, if the offload method is performed during execution of the query, the at least part of the query may be one or more query statements of the query that are not yet executed at the primary database system 100A. Thus, the execution of the query may be completely performed at the primary database system 100A, completely performed at the secondary database system 100B, or shared between the primary database system 100A and the secondary database system 100B. The secondary database system 100B may be configured to send results of the execution of the at least part of the query to the primary database system 100A.

The primary database system 100A and/or the secondary database system 100B may provide the results of the query obtained at the primary database system and/or the secondary database system, in step 317, to the requestor.

Figure 4:
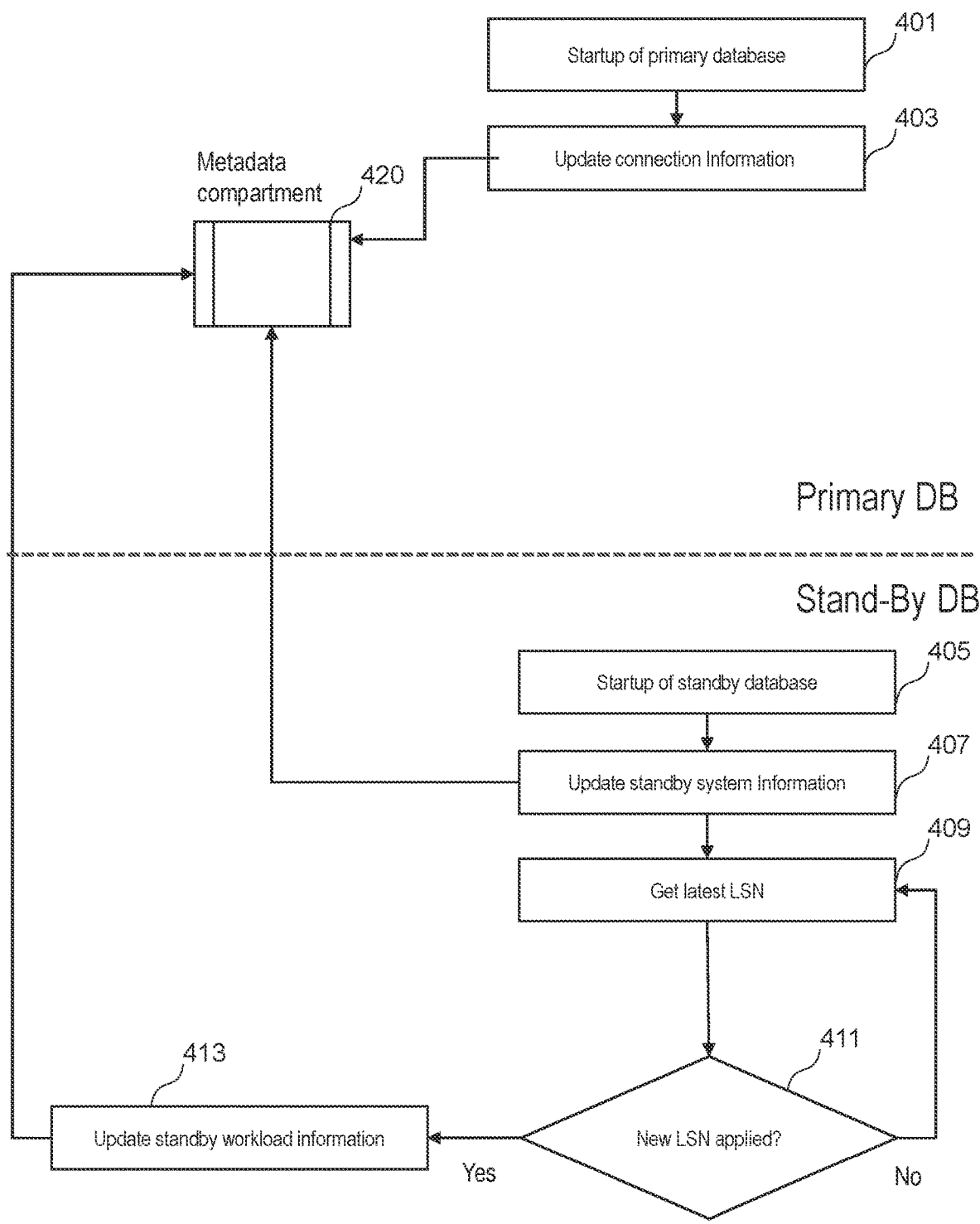
FIG. 4 is a flowchart of an approach for collecting metadata, in accordance with an embodiment of the present invention.

FIG. 4 is a flowchart of an approach for collecting metadata 281 descriptive of a computer system such as computer system 100 in accordance with an example of the present subject matter. For the purpose of explanation, the approach described in FIG. 4 may be implemented in the system illustrated in FIG. 1, but is not limited to this implementation. As indicated in FIG. 4, part of the metadata may be provided (steps 401-403) by the primary database system 100A and the other part may be provided (steps 405-413) by the secondary database system 100B.

Upon start-up (step 401) of the primary database system 100A, the primary database system 100A may determine and store connection information, in step 403, in a metadata compartment 420. This may provide current and up-to-date connection information. The connection information may comprise information about the connection between the primary database system 100A and the secondary database system 100B. If the connection information already exists (e.g., from a previous iteration of the present approach) in the metadata compartment 420, storing in step 403 the currently determined connection information may comprise the primary database system 100A updating the existing connection information in the metadata compartment 420. For example, during start-up of the primary database system 100A, information may be written to the metadata compartment in the form of values of the following parameters: HADR_LOCAL_HOST, HADR_LOCAL_SVC, HADR_REMOTE_HOST, HADR_REMOTE_SVC, HADR_SYNCMODE, HADR_REPLAY_DELAY. HADR may refer to the high availability and disaster recovery system such as the computer system 100. HADR_LOCAL_HOST is the local host name. HADR_LOCAL_SVC is the local service name. HADR_REMOTE_HOST is the remote host name. HADR_REMOTE_SVC is the remote service name. HADR_SYNCMODE specifies the synchronization mode, which determines how log writes on the primary database system are synchronized with log writes on the secondary database system when the systems are in peer state. HADR_REPLAY_DELAY specifies the number of seconds that must pass from the time that a transaction is committed on the primary database to the time that the transaction is committed on the secondary database. This information may be updated during start-up of the primary database system 100A.

Upon start-up (step 405) of the secondary database system 100B, the secondary database system 100B may determine and store system information of the secondary database system 100B, in step 407, in the metadata compartment 420. This may provide current and up-to-date system information. If the system information already exists (e.g., from a previous iteration of the present method) in the metadata compartment 420, storing in step 407 the currently determined system information may comprise the secondary database system 100B updating the existing system information in the metadata compartment 420. For example, when the secondary database system starts up, the following information may be written in the metadata storage compartment from the secondary database system: the first information "HADR_SYNCMODE=NEARSYNC" indicates the synchronization level between the primary and secondary database, the second information "HADR_STATE=PEER" indicates that the primary and secondary database systems are connected and are in peer state, the secondary database system as being peer, and the information "HADR_REPLAY_DELAY=0" indicates the log replay delay.

In step 409, the secondary database system 100B may obtain the latest log sequence number (LSN). The secondary database system 100B may determine (decision 411) whether the obtained LSN is a new applied LSN. In case the obtained LSN is a new applied LSN, the secondary database system 100B may store workload information, in step 413, in the metadata compartment 420. The workload information may comprise the obtained LSN. If the workload information already exists (e.g., from a previous iteration of the present method) in the metadata compartment 420, storing in step 413 the workload information may comprise the secondary database system 100B updating the existing workload information in the metadata compartment 420. For example, during normal processing, the secondary database system 100B reports workload information to the metadata storage compartment as values of the following parameters:

PRIMARY_LOG_FILE,PAGE,POS, STANDBY_LOG_FILE,PAGE,POS, HADR_LOG_GAP(bytes), STANDBY_REPLAY_LOG_FILE,PAGE,POS, PRIMARY_LOG_TIME, STANDBY_LOG_TIME, STANDBY_REPLAY_LOG_TIME. The parameter PRIMARY_LOG_FILE,PAGE,POS indicates the location, namely the log file corresponding to the log position of the LSN, page number in the file corresponding to the log position and the log position of the LSN in the primary database system. The parameter STANDBY_LOG_FILE,PAGE,POS indicates the location, namely the log file corresponding to the log position of the LSN, page number in the file corresponding to the log position and the log position of the LSN in the secondary database system. HADR_LOG_GAP may be the running average of (PRIMARY_LOG_POS-STANDBY_LOG_POS) which may indicate how far the secondary database is behind the primary database in term of synchronization/applied changes. STANDBY_REPLAY_LOG_FILE,PAGE,POS refers to the name of the log file corresponding to the standby replay log position on a log stream and the page number in the file corresponding to the standby replay log position. PRIMARY_LOG_TIME indicates the latest transaction timestamp on a log stream on the primary database system. STANDBY_LOG_TIME indicates the latest transaction timestamp on a log stream on the secondary database system. STANDBY_REPLAY_LOG_TIME indicates the transaction timestamp of logs being replayed on the secondary database system.

Figure 5:
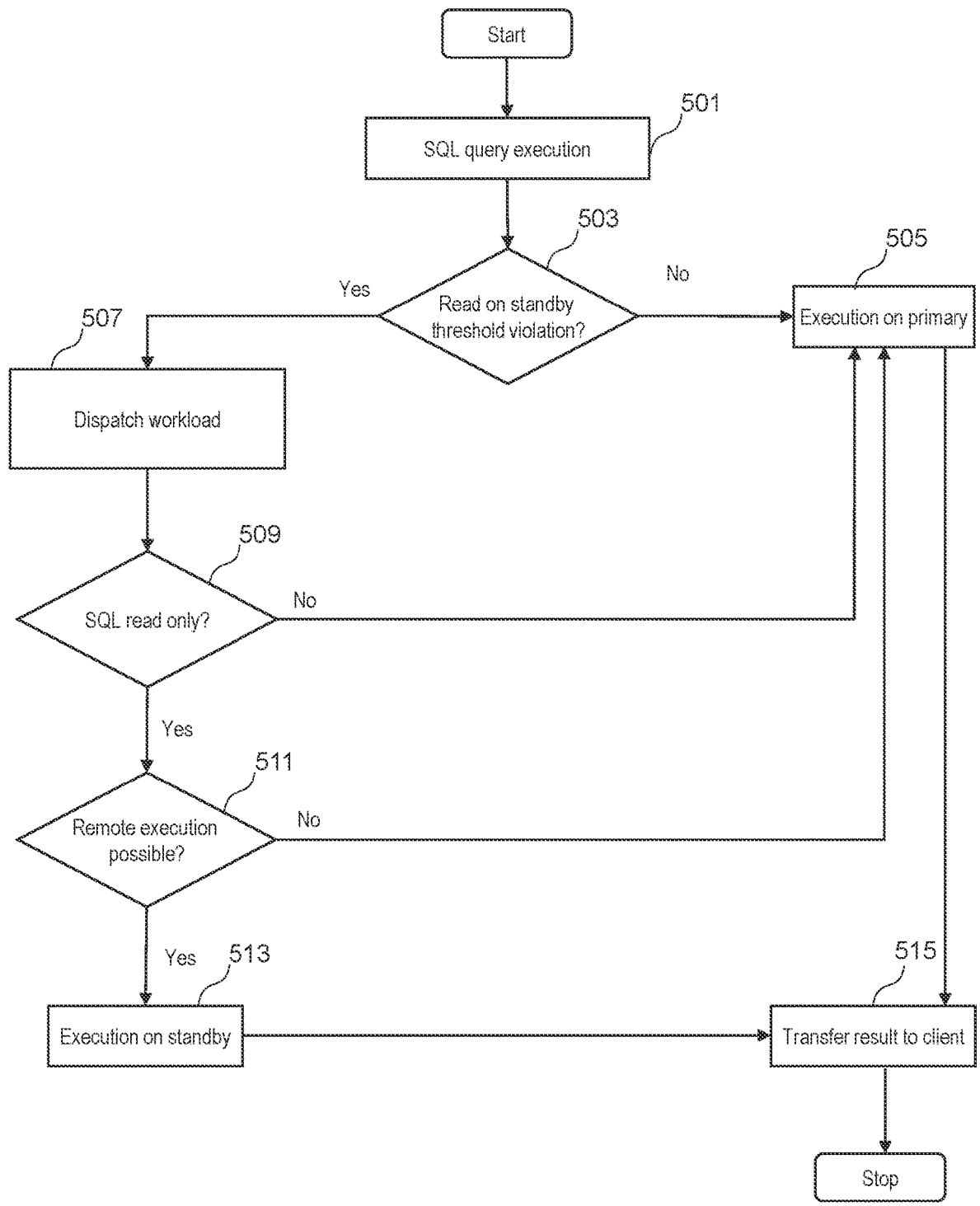
FIG. 5 is a flowchart of an approach for executing a query, in accordance with an embodiment of the present invention.

FIG. 5 is a flowchart of executing a query in a computer system such as computer system 100, in accordance with an embodiment of the present invention. For the purpose of explanation, the approach described in FIG. 5 may be implemented in the system illustrated in FIG. 2, but is not limited to this implementation.

A processor may receive an SQL query execution request in step 501 from a client. The SQL query may, for example, be assigned by the WLM component 285 to a predefined service class of the WLM component 285 that defines conditions for offloading the SQL query to the secondary database system. The assignment of this service class to the SQL query may trigger the WLM component 285 to determine (step 503) whether the read on standby threshold is violated. In case the read on standby threshold is not violated, a processor may execute the query (step 505) on the primary database system 100A. In case the read on standby threshold is violated, the dispatching engine 286 may dispatch the workload, in step 507. A processor may determine (step 509) whether the SQL query is read only. If the processor determines that the SQL query is not read only, the query may be executed on the primary database system 100A. If the processor determines that the SQL query is read only, the processor may determine (step 511) whether remote execution at the secondary database system 100B is possible. If the processor determines that the remote execution at the secondary database system 100B is not possible, the query may be executed on the primary database system 100A. If the processor determines that the remote execution at the secondary database system 100B is possible, the query may be executed on the secondary database system 100B. Upon a processor executing the query in step 505 or step 513, a processor may transfer the results of the execution of the query, in step 515, to the client. The checked conditions in inquiry steps 503, 509, and 511 may, for example, define the first offload and second offload conditions, which may be referred to as boundary conditions.

Thus, embodiments of the present invention may redirect the SQL query workload to the secondary database system when a threshold violation is detected, and a query execution is possible on the secondary database system. This may be validated using the information, stored in the metadata compartment 280. For example, when the SQL query is read only and all of the following is true, 1) HADR_STATE=PEER, 2) Read on Standby is possible (standby_replay_only_window_active=no) and 3) PRIMARY_LOG_FILE,PAGE, POS=STANDBY_REPLAY_LOG_FILE,PAGE,POS, the SQL query may be redirected to the secondary database system.

The boundary conditions guarantee the consistency of the data for a result set that is retrieved, no matter if it retrieved from primary or secondary database system. If it is acceptable for the application to get a data set that may vary between primary and secondary database systems, the boundary conditions may be lifted. For example, if PRIMARY_LOG_FILE,PAGE, POS>STANDBY_REPLAY_LOG_FILE,PAGE,POS all records may not be applied to the secondary database and a result set may be incomplete. If this exactable, the query may also be routed to the secondary database system.

The following example code may be used by the primary database system to reroute all read-only queries to the secondary database system.

```
CREATE THRESHOLD GOTOSTANDBY1
   FOR SERVICE CLASS READONLY ACTIVITIES
   ENFORCEMENT DATABASE
   WHEN CONCURRENTDBCOORDACTIVITIES > 0
   CONTINUE READ ON STANDBY.
```

For example, using the above code, the following queries may be executed on the secondary and primary database systems respectively, because the first query is a read-only statement and the second query is an update statement, i.e., not read-only statement.

SELECT AMOUNT, MONTH FROM ROS.REVENUE GROUP BY MONTH (in secondary DB system),
UPDATE ROS.REVENUE SET AMOUNT=1000 WHERE MONTH=10 (in primary DB system).

The following example code may be used by the primary database system to reroute all queries that read more than 1000 rows to the secondary database system. The number of rows read may be checked every 10 seconds.

```
CREATE THRESHOLD GOTOSTANDBY2
   FOR SERVICE CLASS READONLY ACTIVITIES
   ENFORCEMENT DATABASE
   WHEN SQLROWSREAD > 1000 CHECKING EVERY 10 SECONDS
   CONTINUE READ ON STANDBY
```

For example, using the above code, the following query may be started on the primary database system 100A and rerouted to the secondary database system 100B if more than a thousand rows are read.

SELECT AMOUNT, MONTH FROM ROS.REVENUE

If the underlying DBMS is collecting the LSN, not only on database level, but also on table level, read-only SQL execution can be rerouted to the secondary database system 100B with consistent results even if both databases are not synchronized. This can be useful if the SQL query affects only tables with no recent DML statements. Accordingly, if PRIMARY_LOG_FILE,PAGE, POS>STANDBY_REPLAY_LOG_FILE,PAGE,POS but PRIMARY_LOG_FILE,PAGE,POS(TABLE A, TABLE B, TABLE C)=STANDBY_REPLAY_LOG_FILE,PAGE,POS (TABLE A, TABLE B, TABLE C), the query referencing tables A, B, and/or C for read can be rerouted to the secondary database system even if the primary and secondary databases comprising said tables are not fully synchronized. The following is an example code for query offloading on table level by the primary database system to the secondary database system.

```
CREATE THRESHOLD GOTOSTANDBY3
    FOR SERVICE CLASS READONLY ACTIVITIES
    ENFORCEMENT DATABASE
    WHEN CONCURRENTDBCOORDACTIVITIES > 0
    CONTINUE READ ON STANDBY
```

The following current metadata indicates that the primary and secondary databases are not synchronized (Primary log position 1000 is not equal to the secondary log position 500); however, the primary and secondary tables named Orders, Customers are synchronized (their log positions are equal to 1000).

```
PRIMARY_LOG_FILE,PAGE,POS = 1000
STANDBY_REPLAY_LOG_FILE,PAGE,POS = 500
PRIMARY_LOG_FILE,PAGE,POS(Orders,Customers) = 1000
STANDBY_REPLAY_LOG_FILE,PAGE,POS(Orders,Customers) = 1000
```

Thus, using the above code, the following query may be rerouted to the secondary database system because the referenced tables are synchronized as indicated by the metadata.

```
SELECT Orders.OrderID, Customers.CustomerName
FROM Orders
INNER JOIN Customers ON Orders.CustomerID = Customers.CustomerID;
```

The present subject matter comprises the following clauses.

Clause 1. A computer implemented method for a computer system, the computer system comprising a primary database system comprising a primary database, the primary database system being configured to connect to a secondary database system of the computer system, the secondary database system comprising a secondary database that replicates the primary database; the method comprising: repeatedly collecting and/or updating metadata indicative of the computer system; receiving, at the primary database system, from a requestor a query referencing the primary database; in response to receiving the query, performing an offload method comprising: determining a load, herein referred to as first load, on the primary database system; in case the first load does not satisfy a first offload condition, executing the query at the primary database system; in case the first load satisfies the first offload condition, determining, using the metadata, a second load on the secondary database system and determining whether the second load satisfies a second offload condition; in case the second load does not satisfy the second offload condition, executing the query at the primary database system; in case the second load satisfies the second offload condition, offloading at least part of the query to the secondary database system in order to execute that at least part of the query over the secondary database; and providing to the requestor results of the query obtained at the primary database system and/or the secondary database system.

Clause 2. The method of clause 1, wherein the offload method is performed before or during execution of the received query.

Clause 3. The method of clause 1, wherein the offload method is repeatedly performed upon receiving the query and until the offloading is performed or until execution of the query is completed.

Clause 4. The method of any of the preceding clauses 1 to 3, the first load comprising at least one of values: bandwidth utilization, central processing unit (CPU) utilization, execution queue length, number of records of the query and runtime, wherein the first offload condition requires that at least one of the values exceeds a respective first threshold.

Clause 5. The method of any of the preceding clauses 1 to 4, the second load comprising at least one of values: bandwidth utilization, CPU utilization, execution queue length, number of records of the query and runtime, wherein the second offload condition requires that at least one of the values exceeds a respective second threshold.

Clause 6. The method of any of the preceding clauses 1 to 5, wherein the first offload condition is the second offload condition.

Clause 7. The method of any of the preceding clauses 1 to 5, wherein the first offload condition is different from the second offload condition.

Clause 8. The method of any of the preceding clauses 1 to 7, the first offload condition further requiring that the received query is a read-only query.

Clause 9. The method of any of the preceding clauses 1 to 8, the metadata comprising connection information of the connection to the secondary database system, and status information of the secondary database system, the status information comprising at least one of availability, last applied transaction and execution queue length.

Clause 10. The method of any of the preceding clauses 1 to 9, wherein the metadata is updated upon start-up of the primary database system and/or start-tup of the secondary database system and/or upon changing data in the secondary database.

Clause 11. The method of clause 9, wherein the connection information is updated upon start-up of the primary database system and the status information is updated upon start-up of the secondary database system and/or upon changing data in the secondary database.

Clause 12. The method of any of the preceding clauses 1 to 11, comprising storing the metadata in a non-persistent storage.

Clause 13. The method of any of the preceding clauses 1 to 12, further comprising determining, using the metadata, whether a copy of data of the primary database that is referenced by the query is present in the secondary database, wherein the offloading is performed if the copy of the data is present in the secondary database.

Clause 14. The method of any of the preceding clauses 1 to 13, being automatically performed at the primary database system.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    storing, to a primary database, metadata indicative of a computer system comprising (i) the primary database, configured to connect to a secondary database, and (ii) the secondary database that replicates the primary database;
    receiving, at the primary database from a requestor, a query referencing data stored to the primary database;
    determining a first load of a first value on the primary database;
    responsive to the first load on the primary database failing to satisfy a first offload condition, initiating, by the primary database, execution of the query;
    executing, by the primary database, a first subset of the query;
    determining, dynamically during execution of the query and subsequent to successfully executing the first subset of the query, a change to the first load on the primary database, wherein the first value of the first load on the primary database has changed to a second value of the first load on the primary database;
    responsive to the second value of the first load satisfying the first offload condition, determining, using the metadata, that a second load on the secondary database satisfies a second offload condition;
    responsive to the second load satisfying the second offload condition:
        offloading, during execution of the received query, a second subset of the query to the secondary database, wherein the second subset is a nonexecuted portion of the query; and
        causing the secondary database to execute the second subset of the query; and
    returning results of the query to the requestor, wherein the results include a result of the first subset of the query executed by the primary database and the second subset of the query executed by the secondary database.

2. The computer-implemented method of claim 1, the first load comprising a selection from the group consisting of: central processing unit (CPU) utilization of the primary database, execution queue length at the primary database, and number of records of the query; and
    wherein the first offload condition requires that at least one of the values exceeds a respective threshold.

3. The computer-implemented method of claim 1, the second load comprising a selection from the group consisting of: central processing unit (CPU) utilization, execution queue length, and number of records of the query; and
    wherein the second offload condition requires that at least one of the values exceeds a respective threshold.

4. The computer-implemented method of claim 1, wherein the first offload condition is the second offload condition.

5. The computer-implemented method of claim 3, wherein the first offload condition is different from the second offload condition.

6. The computer-implemented method of claim 1, the first offload condition further requiring that the received query is a read-only query.

7. The computer-implemented method of claim 1, the metadata comprising connection information of the connection to the secondary database, and status information of the secondary database, the status information comprising a selection from the group consisting of: last applied transaction and execution queue length.

8. The computer-implemented method of claim 1, wherein the metadata is updated upon an occurrence of a selection of the group consisting of: start-up of the primary database, start-up of the secondary database, and changing data in the secondary database.

9. The computer-implemented method of claim 7, wherein the connection information is updated upon start-up of the primary database and the status information is updated upon start-up of the secondary database.

10. The computer-implemented method of claim 1, comprising storing the metadata in non-persistent storage.

11. The computer-implemented method of claim 1, further comprising: determining, using the metadata, that a copy of data of the primary database that is referenced by the query is present in the secondary database, wherein the offloading is performed in response to the copy of the data being present in the secondary database.

12. A computer program product comprising:
    one or more computer readable storage media; and
    program instructions stored on the one or more computer readable storage media to perform operations comprising:
        storing, to a primary database, metadata indicative of a computer system comprising (i) the primary database, configured to connect to a secondary database, and (ii) the secondary database that replicates the primary database;
        receiving, at the primary database from a requestor, a query referencing data stored to the primary database;
        determining a first load of a first value on the primary database;
        responsive to the first load on the primary database failing to satisfy a first offload condition, initiating, by the primary database, execution of the query;
        executing, by the primary database, a first subset of the query;
        determining, dynamically during execution of the query and subsequent to successfully executing the first subset of the query, a change to the first load on the primary database, wherein the first value of the first load on the primary database has changed to a second value of the first load on the primary database;
        responsive to the second value of the first load satisfying the first offload condition, determining, using the metadata, that a second load on the secondary database satisfies a second offload condition;
        responsive to the second load satisfying the second offload condition:
            offloading during execution of the received query, a second subset of the query to the secondary database, wherein the second subset is a nonexecuted portion of the query; and causing the secondary database to execute the second subset of the query; and returning results of the query to the requestor, wherein the results include a result of the first subset of the query executed by the primary database and the second subset of the query executed by the secondary database.

13. The computer program product of claim 12, the first load comprising a selection from the group consisting of: central processing unit (CPU) utilization of the primary database, execution queue length at the primary database, and number of records of the query; and wherein the first offload condition requires that at least one of the values exceeds a respective threshold.

14. The computer program product of claim 12, the second load comprising a selection from the group consisting of: central processing unit (CPU) utilization, execution queue length, and number of records of the query; and wherein the second offload condition requires that at least one of the values exceeds a respective threshold.

15. The computer program product of claim 12, wherein the first offload condition is the second offload condition.

16. A computer system comprising:

a processor set;

one or more computer readable storage media; and program instructions stored on the one or more computer readable storage media to cause the processor set to perform operations comprising:

storing, to a primary database, metadata indicative of a computer system comprising (i) the primary database, configured to connect to a secondary database, and (ii) the secondary database that replicates the primary database;

receiving, at the primary database from a requestor, a query referencing data stored to the primary database;

determining a first load of a first value on the primary database;

responsive to the first load on the primary database failing to satisfy a first offload condition, initiating, by the primary database, execution of the query;

executing, by the primary database, a first subset of the query;

determining, dynamically during execution of the query and subsequent to successfully executing the first subset of the query, a change to the first load on the primary database, wherein the first value of the first load on the primary database has changed to a second value of the first load on the primary database;

responsive to the second value of the first load satisfying the first offload condition, determining, using the metadata, that a second load on the secondary database satisfies a second offload condition;

responsive to the second load satisfying the second offload condition:

offloading during execution of the received query, a second subset of the query to the secondary database, wherein the second subset is a nonexecuted portion of the query; and causing the secondary database to execute the second subset of the query; and returning results of the query to the requestor, wherein the results include a result of the first subset of the query executed by the primary database and the second subset of the query executed by the secondary database.

* * * * *